US007616332B2

(12) United States Patent
Kenner

(10) Patent No.: US 7,616,332 B2
(45) Date of Patent: Nov. 10, 2009

(54) SYSTEM FOR READING AND AUTHENTICATING A COMPOSITE IMAGE IN A SHEETING

(75) Inventor: Martin A. Kenner, Burnsville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 923 days.

(21) Appl. No.: 11/002,943

(22) Filed: Dec. 2, 2004

(65) Prior Publication Data

US 2006/0119876 A1 Jun. 8, 2006

(51) Int. Cl.
*G06F 15/00* (2006.01)
*G60F 11/00* (2006.01)

(52) U.S. Cl. .................................... 358/1.14; 358/1.18

(58) Field of Classification Search .................. 358/1.1, 358/1.9, 1.13, 1.14, 1.15, 1.18, 402; 382/100
See application file for complete search history.

(56) References Cited

U.S. PATENT DOCUMENTS 1,905,716 A 4/1933 Ives
1,918,705 A 7/1933 Ives
2,039,648 A 5/1936 Ives
2,063,985 A 12/1936 Coffey
2,279,825 A 4/1942 Kaszab
2,326,634 A 8/1943 Gebhard et al.
2,500,511 A 3/1950 Bonnet
2,622,472 A 12/1952 Bonnet
2,833,176 A 5/1958 Ossoinak
3,154,872 A 11/1964 Nordgren
3,161,509 A 12/1964 Howe et al.
3,306,974 A 2/1967 Cunnally
3,357,770 A 12/1967 Clay
3,365,350 A 1/1968 Cahn
3,442,569 A 5/1969 Bonnet
3,459,111 A 8/1969 Cooper, Jr.
3,503,315 A 3/1970 Montebello
3,584,369 A 6/1971 Montebello
3,607,273 A 9/1971 Kinney
3,613,539 A 10/1971 Dudley
3,676,130 A 7/1972 Burckhardt et al.

(Continued)

FOREIGN PATENT DOCUMENTS

CA 2326180 10/1999

(Continued)

OTHER PUBLICATIONS

Weekly Reports of the Meetings of the Academy of Science published, in accordance with an academy decision dated Jul. 13, 1835, vol. 146, Jan.-Jun. 1908, pp. 446-451.

(Continued)

*Primary Examiner*—Gabriel I Garcia
(74) *Attorney, Agent, or Firm*—Melissa E. Buss

(57) ABSTRACT

A system for reading and authenticating a composite image in a sheeting. A exemplary embodiment of the invention provides a system for reading and authenticating a sheeting including a composite image that appears to the unaided eye to be floating above or below the sheeting or both. The present invention also relates to methods of reading and authenticating a composite image that appears to the unaided eye to be floating above or below the sheeting or both.

47 Claims, 7 Drawing Sheets

U.S. PATENT DOCUMENTS

| | | | |
|---|---|---|---|
| 3,706,486 | A | 12/1972 | de Montebello |
| 3,751,258 | A | 8/1973 | Howe et al. |
| 3,801,183 | A | 4/1974 | Sevelin et al. |
| 4,034,555 | A | 7/1977 | Rosenthal |
| 4,082,426 | A | 4/1978 | Brown |
| 4,099,838 | A | 7/1978 | Cook et al. |
| 4,121,011 | A | 10/1978 | Glover et al. |
| 4,200,875 | A | 4/1980 | Galanos |
| 4,315,665 | A | 2/1982 | Haines |
| 4,424,990 | A | 1/1984 | White et al. |
| 4,541,727 | A | 9/1985 | Rosenthal |
| 4,552,442 | A | 11/1985 | Street |
| 4,557,590 | A | 12/1985 | Winnek |
| 4,618,552 | A | 10/1986 | Tanaka et al. |
| 4,629,667 | A | 12/1986 | Kistner et al. |
| 4,634,220 | A | 1/1987 | Hockert et al. |
| 4,650,283 | A | 3/1987 | Orensteen et al. |
| 4,668,063 | A | 5/1987 | Street |
| 4,688,894 | A | 8/1987 | Hockert |
| 4,691,993 | A | 9/1987 | Porter et al. |
| 4,708,920 | A | 11/1987 | Orensteen et al. |
| 4,714,656 | A | 12/1987 | Bradshaw et al. |
| 4,732,453 | A | 3/1988 | de Montebello et al. |
| 4,743,526 | A | 5/1988 | Ando et al. |
| 4,757,350 | A | 7/1988 | Street |
| 4,775,219 | A | 10/1988 | Appeldorn et al. |
| 4,799,739 | A | 1/1989 | Newswanger |
| 4,927,238 | A | 5/1990 | Green et al. |
| 4,935,335 | A | 6/1990 | Fotland |
| 5,064,272 | A | 11/1991 | Bailey et al. |
| 5,169,707 | A | 12/1992 | Faykish et al. |
| 5,254,390 | A | 10/1993 | Lu |
| 5,279,912 | A | 1/1994 | Telfer et al. |
| 5,330,799 | A | 7/1994 | Sandor et al. |
| 5,359,454 | A | 10/1994 | Steenblik et al. |
| 5,449,597 | A | 9/1995 | Sawyer |
| 5,455,689 | A | 10/1995 | Taylor et al. |
| 5,554,432 | A | 9/1996 | Sandor et al. |
| 5,594,841 | A | 1/1997 | Schutz |
| 5,639,580 | A | 6/1997 | Morton |
| 5,642,226 | A | 6/1997 | Rosenthal |
| 5,644,431 | A | 7/1997 | Magee |
| 5,671,089 | A | 9/1997 | Allio |
| 5,680,171 | A | 10/1997 | Lo et al. |
| 5,681,676 | A | 10/1997 | Telfer et al. |
| 5,689,372 | A | 11/1997 | Morton |
| 5,717,844 | A | 2/1998 | Lo et al. |
| 5,744,291 | A | 4/1998 | Ip |
| 5,757,550 | A | 5/1998 | Gulick, Jr. |
| 5,850,278 | A | 12/1998 | Lo et al. |
| 5,850,580 | A | 12/1998 | Taguchi et al. |
| 5,896,230 | A | 4/1999 | Goggins |
| 6,084,713 | A | 7/2000 | Rosenthal |
| 6,095,566 | A * | 8/2000 | Yamamoto et al. ............ 283/75 |
| 6,288,842 | B1 | 9/2001 | Krasa et al. |
| 6,791,723 | B1 * | 9/2004 | Vallmajo et al. ............ 358/488 |
| 6,919,892 | B1 * | 7/2005 | Cheiky et al. ............... 345/473 |
| 2002/0054434 | A1 | 5/2002 | Krasa et al. |
| 2002/0126396 | A1 * | 9/2002 | Dolgoff ...................... 359/743 |
| 2003/0116630 | A1 * | 6/2003 | Carey et al. ............ 235/462.09 |
| 2005/0057812 | A1 * | 3/2005 | Raber ......................... 359/619 |

FOREIGN PATENT DOCUMENTS

| | | | |
|---|---|---|---|
| DE | 198 04 997 | C1 | 2/1999 |
| EP | 0 314 134 | | 5/1989 |
| EP | 0 583 766 | | 2/1994 |
| EP | 1 130 541 | A2 | 9/2001 |
| JP | 7-281327 | | 10/1995 |
| WO | WO 83/03019 | | 9/1983 |
| WO | WO 02/22376 | A1 | 3/2002 |
| WO | WO 03/005075 | | 1/2003 |
| WO | WO 03/022598 | A1 | 3/2003 |

OTHER PUBLICATIONS

Pai, V.M., et al., "Microscopic flow visualization system for fluids in magnetic field", Journal of Magnetism and Magnetic Materials, vol. 194, No. 1-3, Apr. 1999, pp. 262-266.

Bollard, Dana et al., "Computer Vision", Prentice Hall, Inc., 1982, pp. 65-70.

3M Security Systems Division, 3M™ Full Page Reader Product Fact Sheet, 2004, 6 pages.

3M Security Systems Division, 3M™ ePassport Reader Product Fact Sheet, 2004, 6 pages.

3M Security Systems Division, 3M™ Inspection Reader Product Fact Sheet, 2004, 2 pages.

3M Security Systems Division, 3M™ Authentication Reader Product Fact Sheet, 2004, 4 pages.

U.S. Application entitled "Tamper-indicating Printable Sheet for Securing Documents of Value and Methods of Making the Same," Kuo et al., filed Aug. 6, 2004, having U.S. Appl. No. 10/913,850.

U.S. Application entitled "A Password Reader for Processing a Passport Having an RFID Element," Ronald D. Jesme, filed Sep. 28, 2004, having U.S. Appl. No. 10/953,200.

* cited by examiner

SYSTEM FOR READING AND AUTHENTICATING A COMPOSITE IMAGE IN A SHEETING

TECHNICAL FIELD

The present invention relates to a system for reading and authenticating a composite image in a sheeting. The present invention relates more particularly to system for reading and authenticating a sheeting including a composite image that appears to the unaided eye to be floating above or below the sheeting. The present invention also relates more particularly to methods of reading and authenticating a composite image that appears to the unaided eye to be floating above or below the sheeting.

BACKGROUND OF THE INVENTION

As tampering and counterfeiting of identification documents, such as passports, driver's licenses, identification cards and badges, and documents of value, such as bonds, certificates, and negotiable instruments, increase, there is a need for greater security features and measures. Using commonly available technology, it is possible to alter such typed, printed, photographed or handwritten details in such a way that the document can then show that the ownership of that document, or an article to which that document relates, has been transferred to a party not legally entitled to that document or article. To impede the successful tampering or alteration of such details, it is a known practice to apply a security laminate over the top of such details. Such laminates may contain security features that will indicate whether the laminate itself is genuine, whether the laminate has been lifted or replaced, whether the laminate's surface has been penetrated, and whether that laminate surface has been overprinted or overlabelled. Other security features can include printing or patterns that respond to ultra-violet or infra-red light.

One example of a commercially available security laminate is the 3M™ Confirm™ Security Laminate with Floating Images, which is sold by 3M Company based in St. Paul, Minn. This security laminate with floating image is also described in U.S. Pat. No. 6,288,842 B1, "Sheeting with Composite Image that Floats," (Florczak et al.), which is owned by the same assignee as the present application. This patent discloses microlens sheetings with composite images in which the composite image floats above or below the sheeting, or both. The composite image may be two-dimensional or three-dimensional. Methods for providing such an imaged sheeting, including by the application of radiation to a radiation sensitive material layer adjacent the microlens, are also disclosed in this patent.

A variety of security readers are known in the art. For example, U.S. Pat. No. 6,288,842, "Security Reader for Automatic Detection of Tampering and Alteration, (Mann) discloses a security reader for reading and processing information about security laminates. One example of a passport reader is commercially available from 3M Company based in St. Paul, Minn. and 3M AiT, Ltd. based in Ottawa, Ontario, Canada, as the 3M™ Full Page Reader (formerly sold as the AiT™ imPAX™ Reader).

A variety of machine vision systems are known in the art. For example, *Computer Vision* written by Dana Bollard and Christopher Brown is a text book concerning computer vision or machine vision. *Computer Vision* discloses that computer vision or machine vision is the enterprise of automating and integrating a wide range of processes and representations used for vision perception. It includes as parts many techniques that are useful by themselves, such as image processing (transforming, encoding, and transmitting images) and statistical pattern classification (statistical decision theory applied to general patterns, visual or otherwise), geometric modeling, and cognitive processing. In essence, machine vision is taking a two-dimensional representation of a three-dimensional scene and trying to replicate the three-dimensional scene. However, machine vision systems are not used for verifying the existence of a perceived three-dimensional security feature and then authenticating such security feature by comparing it to a database of security features.

Although the commercial success of available security features and security readers has been impressive, as the capabilities of counterfeiters continues to evolve, it is desirable to further improve the ability to indicate that a security feature has been tampered with or somehow compromised to help protect against counterfeiting, alteration, duplication, and simulation.

SUMMARY OF THE INVENTION

One aspect of the present invention provides a system for reading and authenticating a composite image in a sheeting. The system for reading and authenticating a composite image in a sheeting comprises: a sheeting including a composite image that appears to the unaided eye to be floating above or below the sheeting or both; a reader, comprising: a first camera to capture a first image of the sheeting and a first image of the composite image floating above or below the sheeting or both; a second camera to capture a second image of the sheeting and a second image of the composite image floating above or below the sheeting or both; and a computer for comparing the first image and the second image of the sheeting and for comparing the first image and second image of the composite image floating above or below the sheeting or both to calculate the perceived distance between the sheeting and the composite image floating above or below the sheeting or both.

In one preferred embodiment of the above system, the system further comprises a database including information about composite images that float above or below the sheeting or both and their floating distances relative to the sheeting. In another aspect of this embodiment, the computer compares the first image of the composite image that floats above or below the sheeting or both to the database of composite images to identify the composite image. In another aspect of this embodiment, the system compares the calculated perceived distance between the sheeting and the composite image with the floating distances in the database to provide information about the sheeting. In yet another aspect of this embodiment, the calculated perceived distance matches the floating distance in the database for the identified composite image and the system thereby authenticates the sheeting. In another aspect of this embodiment, the calculated perceived distance does not match the floating distances in the database for the identified composite image and the system thereby determines that the sheeting is not authentic.

In one preferred embodiment of the above system, the first camera and second camera are perpendicular to the sheeting. In another preferred embodiment of the above system, the sheeting is located in a fixed position. In another preferred embodiment of the above system, the composite image appears under reflected light to float above the sheeting. In yet another preferred embodiment of the above system, the composite image appears in transmitted light to float above the sheeting.

In another preferred embodiment of the above system, the composite image appears under reflected light to float below the sheeting. In another preferred embodiment of the above system, the composite image appears in transmitted light to float below the sheeting. In another preferred embodiment of the above system, the composite image also appears to the unaided eye to be at least in part in the plane of the sheeting.

Another aspect of the present invention provides an alternative system for reading and authenticating a composite image in a sheeting. The system for reading and authenticating a composite image in a sheeting comprises: a sheeting including a composite image that appears to the unaided eye to be floating above or below the sheeting or both; a reader, comprising: a camera moveable between a first position and a second position, wherein in the first position the camera captures a first image of the sheeting and a first image of the composite image floating above or below the sheeting or both, wherein in the second position the camera captures a second image of the sheeting and captures a second image of the composite image floating above or below the sheeting or both; and a computer for comparing the first image and the second image of the sheeting and for comparing the first image and second image of the composite image floating above or below the sheeting or both to calculate the perceived distance between the sheeting and the composite image floating above or below the sheeting or both.

In one preferred embodiment of the above system, the system further comprises a database including information about composite images that float above or below the sheeting or both and their floating distances relative to the sheeting. In another preferred embodiment of the above system, the computer compares the first image of the composite image that floats above or below the sheeting or both to the database of composite images to identify the composite image. In another preferred embodiment of the above system, the system compares the calculated perceived distance between the sheeting and the composite image with the floating distances in the database to provide information about the sheeting.

In another preferred embodiment of the above system, the calculated perceived distance of the floating image, above or below the sheeting or both, matches the floating distance in the database for the identified composite image and the system thereby authenticates the sheeting. In another preferred embodiment of the above system, the calculated perceived distance does not match the floating distances in the database for the identified composite image and the system thereby determines that the sheeting is not authentic. In yet another preferred embodiment of the above system, the sheeting is located in a fixed position.

In another preferred embodiment of the above system, the composite image appears under reflected light to float above the sheeting. In another preferred embodiment of the above system, the composite image appears in transmitted light to float above the sheeting. In another preferred embodiment of the above system, the composite image appears under reflected light to float below the sheeting. In yet another preferred embodiment of the above system, the composite image appears in transmitted light to float below the sheeting. In another aspect of this embodiment, the composite image also appears to the unaided eye to be at least in part in the plane of the sheeting. In another preferred embodiment of the above system, the camera is perpendicular to the sheeting.

Another aspect of the present invention provides an alternative system for reading and authenticating a composite image in a sheeting. The system for reading and authenticating a composite image in a sheeting comprises: a sheeting including a composite image that appears to the unaided eye to be floating above or below the sheeting; a reader, comprising: a camera; and a sheeting holder moveable between a first position and a second position, wherein the microlens sheeting is positioned on the sheeting holder, wherein in the first position the camera captures a first image of the sheeting and a first image of the composite image floating above or below the sheeting or both, wherein in the second position the camera captures a second image of the microlens sheeting and a second image of the composite image floating above or below the sheeting or both; and a computer for comparing the first image and the second image of the sheeting and for comparing the first image and second image of the composite image floating above or below the sheeting or both to calculate the perceived distance between the sheeting and the composite image floating above or below the sheeting or both.

In one preferred embodiment of the above system, the system further comprises a database including information about composite images that float above or below the sheeting or both and their floating distances relative to the sheeting. In another aspect of this embodiment, the computer compares the first image of the composite image that floats above or below the sheeting or both to the database of composite images to identify the composite image. In another aspect of this embodiment, the system compares the calculated perceived distance between the sheeting and the composite image with the floating distances in the database to provide information about the sheeting. In another aspect of this embodiment, the calculated perceived distance matches the floating distance in the database for the identified composite image and the system thereby authenticates the sheeting. In yet another aspect of this embodiment, the calculated distance does not match the floating distances in the database for the identified composite image and the system thereby determines that the sheeting is not authentic.

In another preferred embodiment of the above system, the first camera and second camera are perpendicular to the sheeting. In yet another aspect of this embodiment, the sheeting is located in a fixed position. In another preferred embodiment of the above system, the composite image appears under reflected light to float above the sheeting. In another preferred embodiment of the above system, the composite image appears in transmitted light to float above the sheeting. In another preferred embodiment of the above system, the composite image appears under reflected light to float below the sheeting. In another preferred embodiment of the above system, the composite image appears in transmitted light to float below the sheeting. In yet another aspect of this embodiment, the composite image also appears to the unaided eye to be at least in part in the plane of the sheeting.

Another aspect of the present invention provides a method of reading and authenticating a composite image in a sheeting. The method comprises the steps of: providing a sheeting including a composite image that appears to the unaided eye to be floating above or below the sheeting or both; recording a first image of the microlens sheeting and recording a first image of the composite image floating above or below the sheeting or both; recording a second image of the microlens sheeting and recording a second image of the composite image floating above or below the sheeting or both; calculating the perceived distance between the sheeting and the composite image floating above or below the sheeting or both by comparing the first image and the second image of the microlens sheeting and by comparing the first image and second image of the composite image floating above or below the sheeting or both.

In one preferred embodiment of the above method, the method further includes the step of: providing a database including information about composite images that float above or below the sheeting or both and their floating distances relative to the sheeting. In another aspect of this embodiment, the method further includes the step of: identifying the composite image by comparing the first image of the composite image that floats above or below the sheeting or both to the database of composite images. In another aspect of this embodiment, the method further includes the step of: comparing the calculated perceived distance between the sheeting and the composite image with the floating distances in the database to provide information about the sheeting. In another aspect of this embodiment, the method further includes the step of: providing a signal to a user that the sheeting is authentic when the calculated perceived distance matches the floating distance in the database for the identified composite image and the system. In another aspect of this embodiment, the method further includes the step of: providing a signal to a user that the sheeting is not authentic when the calculated perceived distance does not match the floating distances in the database for the identified composite image.

In one preferred embodiment of the above method, the composite image appears under reflected light to float above the sheeting. In another preferred embodiment of the above system, the composite image appears in transmitted light to float above the sheeting. In another preferred embodiment of the above system, the composite image appears under reflected light to float below the sheeting. In one preferred embodiment of the above method, the composite image appears in transmitted light to float below the sheeting. In yet another preferred embodiment of the above system, the composite image also appears to the unaided eye to be at least in part in the plane of the sheeting.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

Figure 1:
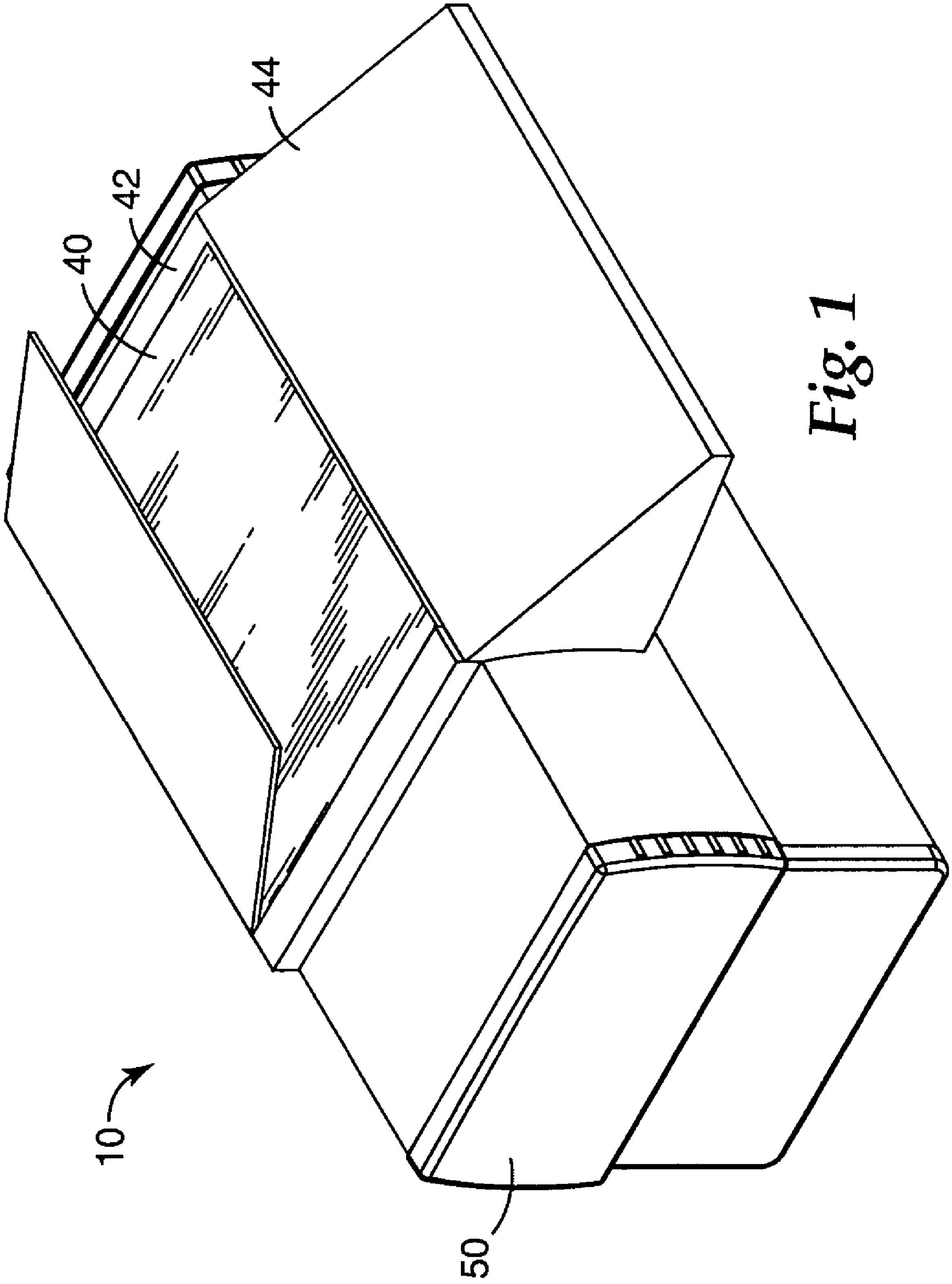
FIG. 1 is a perspective view of one exemplary embodiment of a reader for reading and authenticating a composite image in a sheeting of the present invention.

The system of the present invention reads a composite image that appears to be suspended, or to float, above, in the plane of, and/or below a sheeting. The system of the present invention is also useful for providing information to a user whether or not a sheeting having such a composite image is authentic or not. The system of the present invention is for reading and authenticating a composite image that appears to the unaided eye to be floating above or below a sheeting or both, such a floating composite image as taught in U.S. Pat. No. 6,288,842 B1, ("the '842 patent"), "Sheeting with Composite Image that Floats," (Florczak et al.), which is owned by the same assignee as the present application, and which is hereby incorporated by reference. These composite images are actually three-dimensional, optical illusions, and they are perceived by the user to either be floating above or below the sheeting or both. The system of the present invention assists in calculating the distance that is perceived by the user between the composite image and the sheeting in this optical illusion.

Composite images that appear to the unaided eye to be floating above a sheeting, below a sheeting, or both, are suspended images and are referred to for convenience as floating images. The term "unaided eye" means normal (or corrected to normal) human vision not enhanced by, for example, magnification. These suspended or floating images may be either two or three-dimensional images, can be in black or white or in color, and can appear to move with the observer or change in shape. The sheeting that has a composite image may be viewed using light that impinges on the sheeting from the same side as the observer (reflected light), or from the opposite side of the sheeting as the observer (transmitted light), or both. One example of sheeting including such composite images is shown in FIG. 2*a*, which is explained in more detail below.

In one exemplary embodiment of sheeting containing such composite images as described above, the sheeting includes: (a) at least one layer of microlens, the layer having first and second sides; (b) a layer of material disposed adjacent the first side of the layer of microlens; and (c) an at least partially complete image formed in the material associated with each of a plurality of the microlens, where the image contrasts with the material. Microlens may also be called lenticular lens or microlenslets. The composite image is provided by the individual images, and it appears to the unaided eye to be floating above or below the sheeting, or both. The '842 patent provides a complete description of the microlens sheeting, exemplary material layers of such sheeting, some of which are preferably radiation sensitive material layers, examples of radiation sources for creating the individual images, and exemplary imaging processes.

The sheeting having a composite image as described in the '842 patent may be used in a variety of applications such as securing tamperproof images in passports, ID badges, event passes, affinity cards, or other documents of value, product identification formats and advertising promotions for verification and authenticity, brand enhancement images which provide a floating or sinking or a floating and sinking image of the brand, identification presentation images in graphics applications such as emblems for police, fire or other emergency vehicles; information presentation images in graphics applications such as kiosks, night signs and automotive dashboard displays, and novelty enhancement through the use of composite images on products such as business cards, hang-tags, art, shoes and bottled products. The system of the present invention for reading and authenticating sheeting having a composite image includes a reader for reading and authenticating any of the items mentioned above. For sake of simplicity, the figures of the present application illustrate a passport having a floating image and a passport reader for reading and authenticating the floating image. However, the system of the present invention may include any reader for reading and authenticating any item having a floating image.

FIG. 1 illustrates one embodiment of a reader 10 that is a part of the system of the present invention for reading and authenticating a floating image. In this embodiment, the reader 10 is configured to read passports having floating images. The passport reader 10 includes a housing 50. The housing 50 includes a first portion 42 and a second portion 44. The first portion 42 includes a window 40, preferably made of glass, which is convenient for viewing the optical information found in the passport, such as printed images, photographs, signatures, personal alphanumeric information, and barcodes, and for viewing the floating images on the passport. The second portion 44 of the passport reader includes a ledge, which is convenient for supporting half of a passport when the passport 14 is inserted into the passport reader 10 to be read (shown in FIG. 2). The other half of the passport is placed on the glass 40 when the passport 14 is inserted into the passport reader 10 to be read and authenticated or verified.

Figure 2:
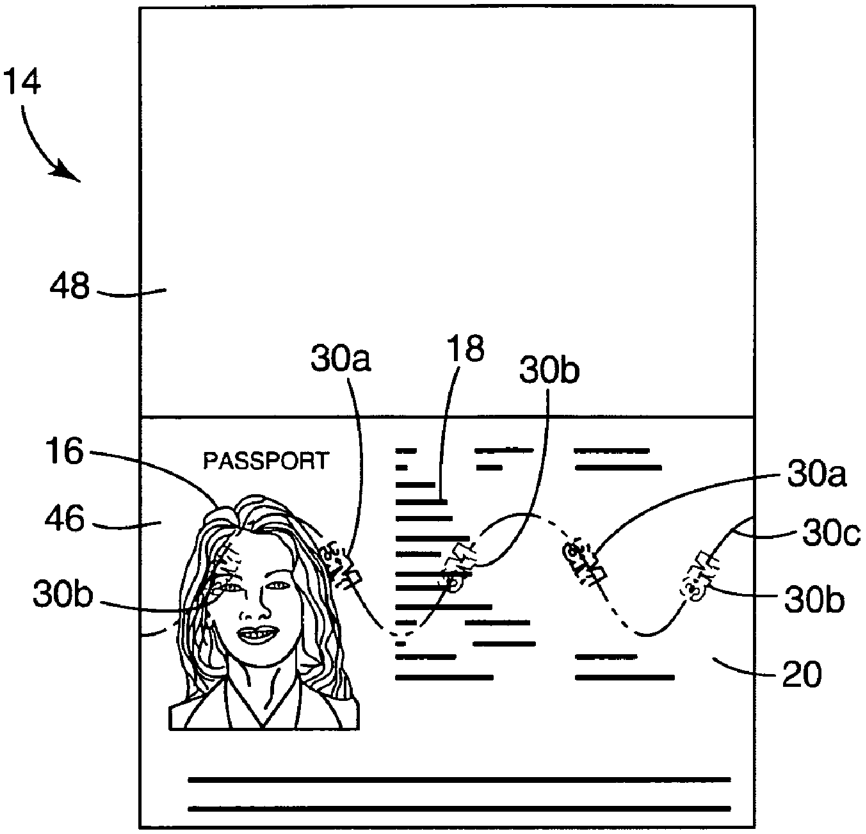
FIG. 2 is a top view of a passport including composite images that appear to float above and appear to float below the sheeting.
Figure 2A:
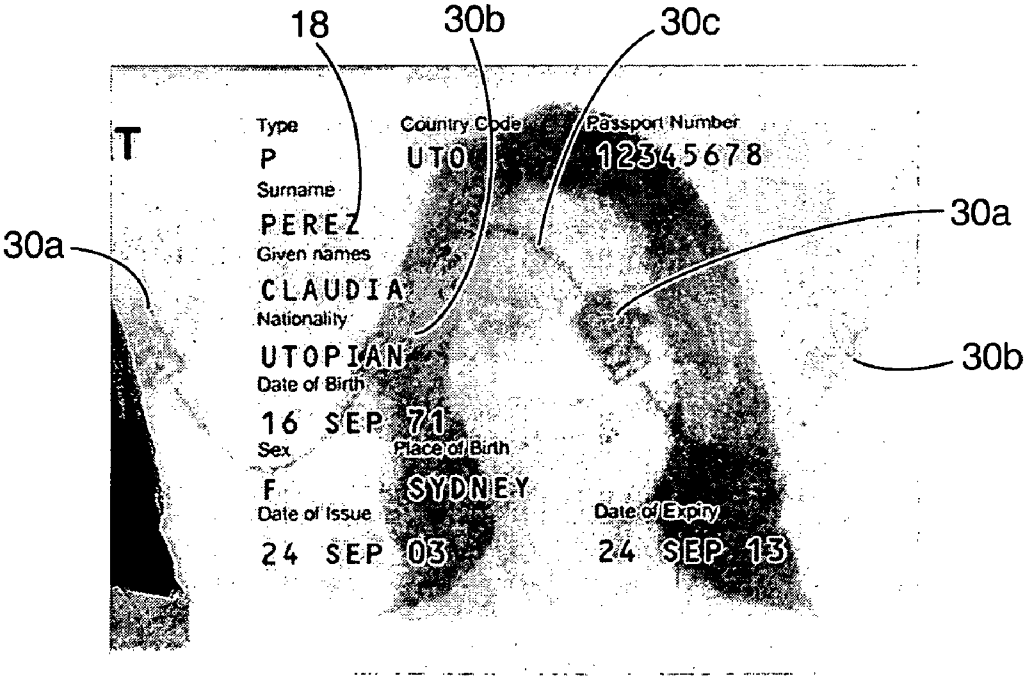
FIG. 2*a* is a photomicrograph of a passport including composite images that appear to float above and appear to float below the sheeting.

FIG. 2 illustrates one embodiment of a schematic document of value including a floating image. FIG. 2*a* is a photomicrograph of a close up view of a portion of an actual document of value including floating images. In this embodiment, the document of value is a passport booklet 14. The passport 14 is typically a booklet filled with several bound pages. One of the pages usually includes personalization data 18, often presented as printed images, which can include photographs 16, signatures, personal alphanumeric information, and barcodes, and allows human or electronic verification that the person presenting the document for inspection is the person to whom the passport 14 is assigned. This same page of the passport may have a variety of covert and overt security features, such as those security features described in U.S. patent application Ser. No. 10/193,850, "Tamper-Indicating Printable Sheet for Securing Documents of Value and Methods of Making the Same, filed on Aug. 6, 2004 by the same assignee as the present application, which is hereby incorporated by reference. In addition, this same page of the passport 14 includes a laminate of microlens sheeting 20 having composite images 30, which appear to the unaided eye to float either above or below the sheeting 20 or both. This feature is a security feature that is used to verify that the passport is an authentic passport and not a fake passport. One example of suitable microlens sheeting 20 is commercially available from 3M Company based in St. Paul, Minn. as 3M™ Confirm™ Security Laminate with Floating Images.

In this embodiment of the passport 14, the composite images 30 or floating images 30 include three different types of floating images. The first type of floating image 30*a* is a "3M" that appears to the unaided eye to float above the page in the passport 14. The second type of floating image 30*b* is a "3M" that appears to the unaided eye to float below the page in the passport 14. The third type of floating image 30*c* is a sine wave that appears to the unaided eye to float above the page in the passport 14. When the passport 14 is tilted by a user, the floating images 30*a*, 30*b*, 30*c* may appear to move to the observer. In reality, the floating images 30*a*, 30*b*, 30*c* are optical illusions that appear to the viewer's unaided eye to be floating above or below the sheeting 20 or both. The passport 14 or document of value may include any combination of floating images that float above, below and/or in the plane of the passport 14. The floating images may be any configuration and may include words, symbols, or particular designs that correspond to the document of value. For instance, passports issued by the Australian government include microlens sheeting having floating images in the shape of a kangaroo and boomerangs, two symbols representing the country. The other pages of the passport booklet may contain blank pages for receiving a country's stamp, as the person is processed through customs.

In the past, when a passport has been presented to a customs official as the person is being processed through customs to either leave or enter in a country, the customs official would typically look at the passport 14 with his unaided eyes to see if the passport included the appropriate floating images 30 to verify that the passport was authentic. However, as counterfeiters become more and more sophisticated, it may become necessary in the future to provide systems that assist the official in verifying that the passport is authentic based on the security feature of the floating images. The system of the present invention first verifies that the passport or document of value contains at least one floating image 30. Then, the system verifies that the floating image 30 is the correct floating image 30. Lastly, the system verifies the perceived distance between the floating image 30 and the passport page having the microlens sheeting, known as the "floating distance." If this floating distance is the correct distance or within some margin of error, then the system verifies or authenticates or otherwise communicates to the customs official that the passport is an authentic passport. If, however, the floating distance is not the correct distance, the system indicates to the customs official that the passport is a forgery or a fake. The system also helps reduce time and effort spent by the customs official processing the passport.

Figure 3:
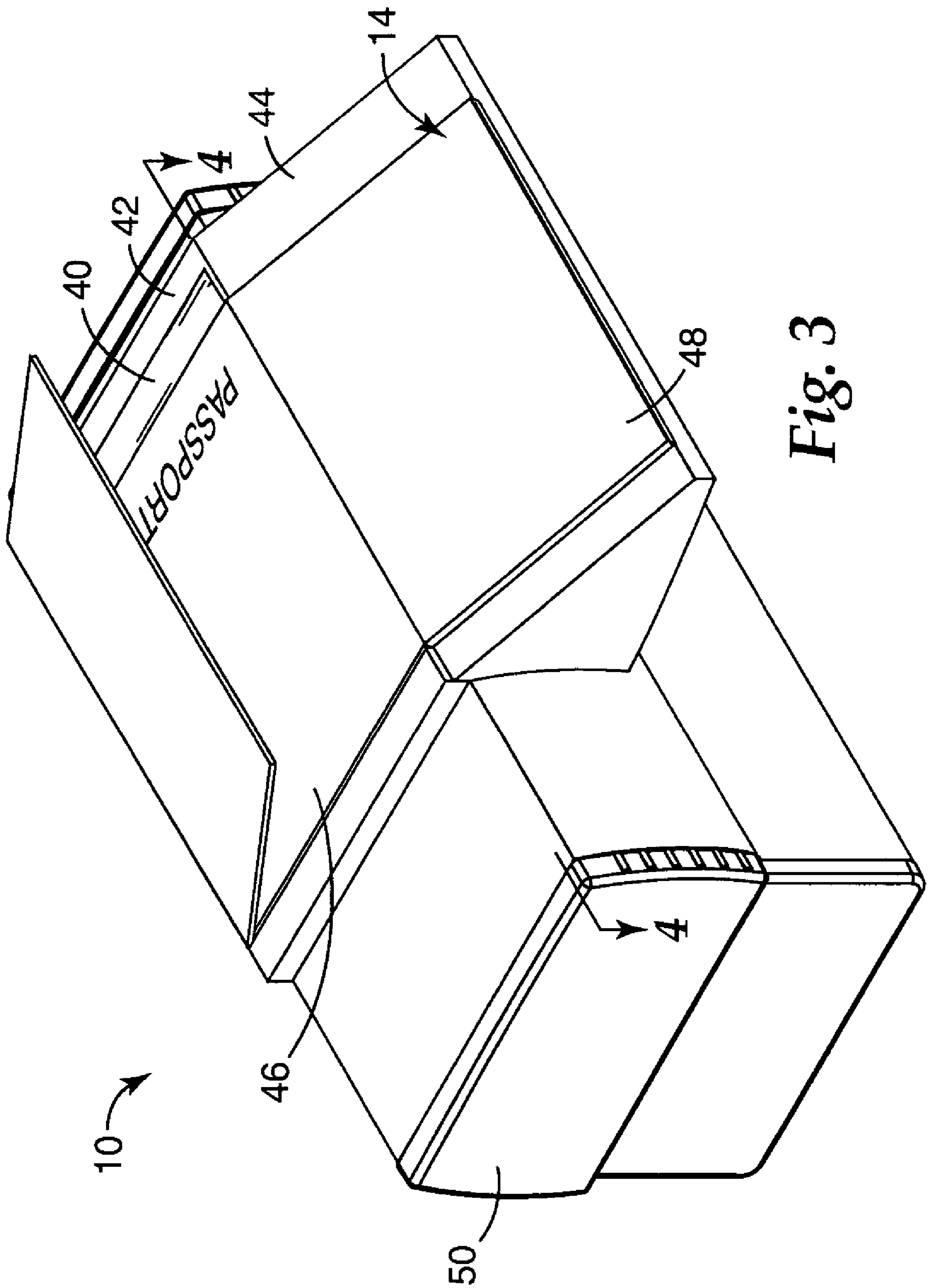
FIG. 3 is a perspective view of the passport of FIG. 2 being read by the reader of FIG. 1.

FIG. 3 illustrates the passport reader 10 of the system in combination with a passport 14. To read the passport, the passport booklet 14 is opened up to the page containing the floating images, creating a first portion 46 of the passport and second portion 48 of the passport. In this case, the page of the passport 14 having the floating images is the same page that contains the personalization data 18, such as the picture 16 of the individual carrying the passport. Next, the passport booklet is inserted into the passport reader 10, such that the floating images 30 and the personalization data 18 in the first portion 46 of the passport 14 are adjacent (or placed over) the glass 40 of the reader 10. The second portion 48 of the passport 14 is in contact with the ledge 44 of the reader, and the seam of the passport 14 extends along the junction between adjacent edges of the glass 40 and the ledge 44. This placement of the passport 14 on the passport reader 50 is convenient for reading the floating images 30 and the personalization data 18, which is explained in more detail below in reference to FIGS. 4-7.

Figure 4:
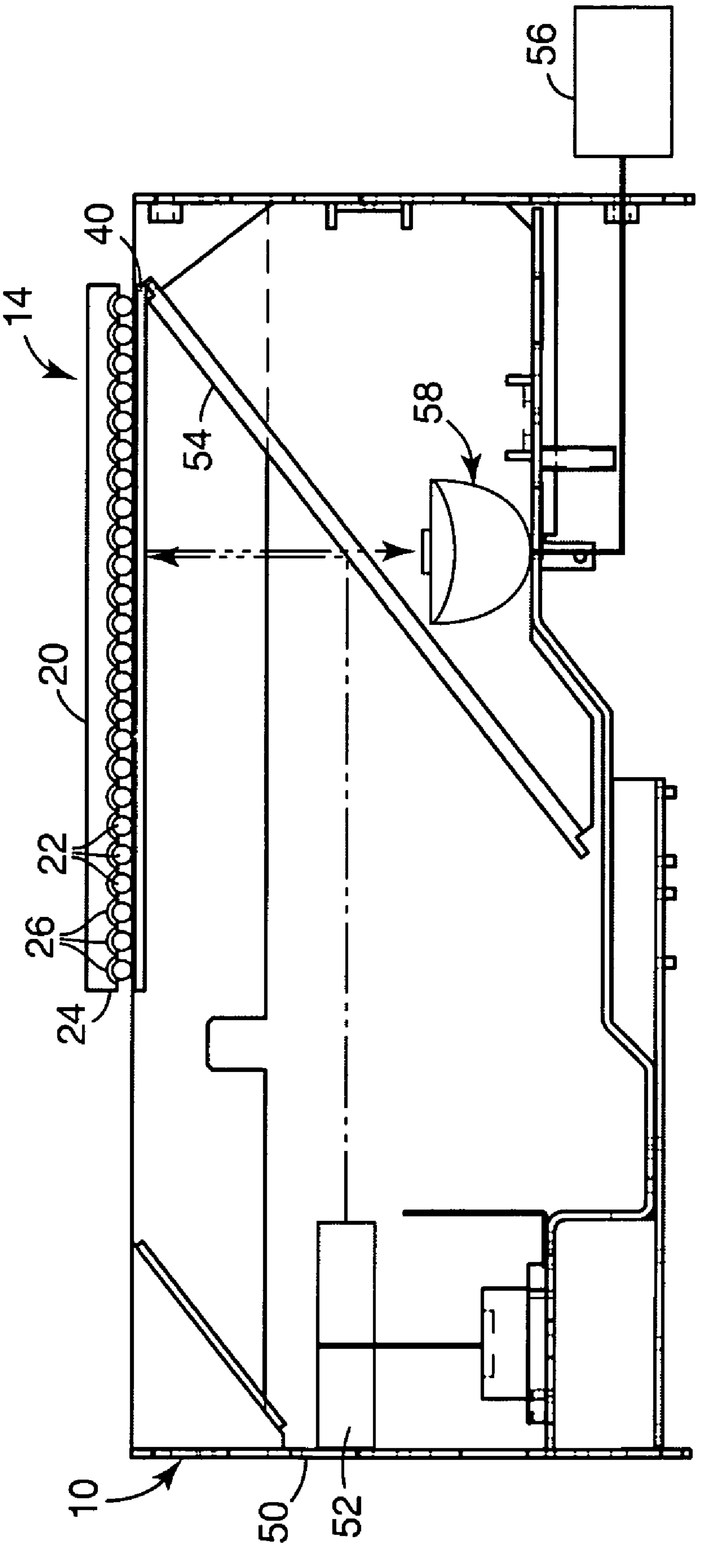
FIG. 4 is a side, cross-sectional, schematic view of the passport reader and passport of FIG. 3.

FIG. 4 is convenient for illustrating the inside of the passport reader 14 when the passport is being read and verified. The passport reader 14 can read the personalization data 18 from the passport and to perform this feature, the passport reader 14 contains many of the same parts (not illustrated) as the Full Page Readers sold under the 3M brand from 3M Company located in St. Paul, Minn. For example, the cameras in the reader 10 are also used to record and transmit the personalization information on the passport to the computer. However, the difference between the passport reader 14 of the system of the present invention and the Full Page Readers is that the passport reader 14 of the present invention can read and authenticate floating images 30.

Figure 5:
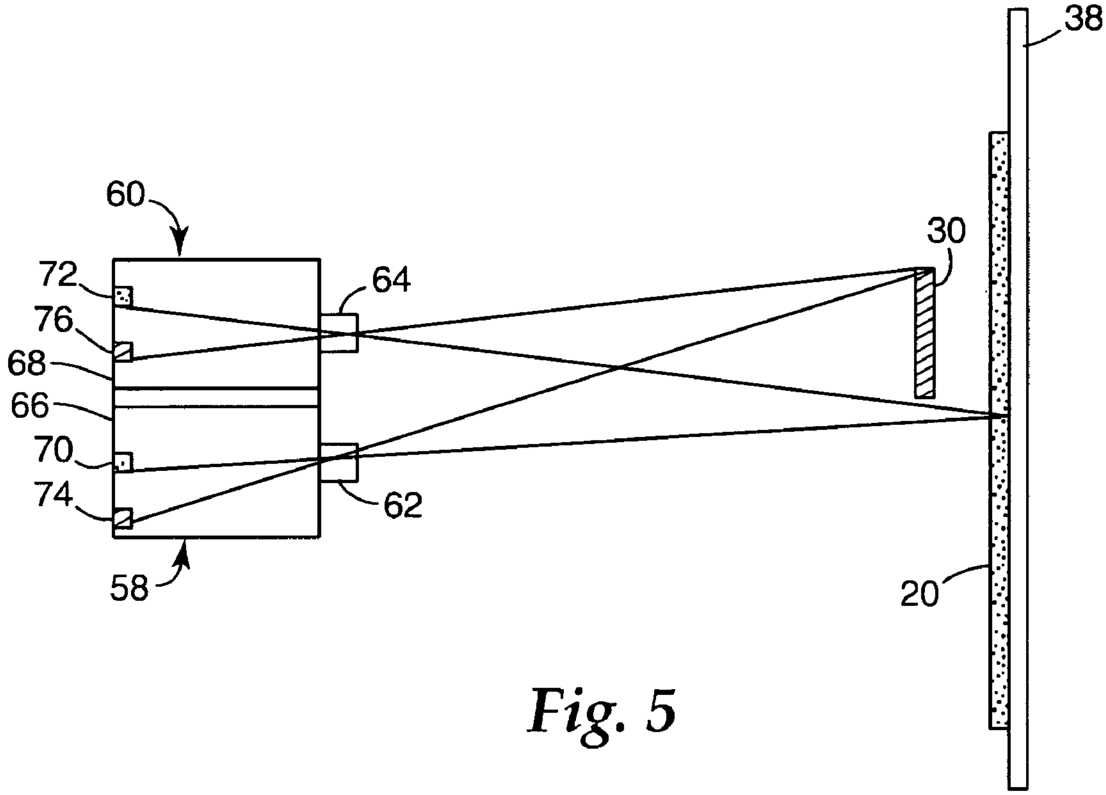
FIG. 5 illustrates a schematic view of one exemplary embodiment of the cameras in the system for reading and authenticating a composite image in a sheeting of the present invention.

The passport reader 14 includes light source 52, a mirror 54, and at least a first camera 58. The reader 14 may optionally include a second camera 60 (FIG. 5.). The mirror 54 is preferably a half-silvered mirror that can both reflect and transmit light. The microlens sheeting 20 on the passport 14 is viewable through the glass window 40. As mentioned above, the microlens sheeting 20 preferably includes a layer of microlens 22 and a layer of radiation sensitive material layer 24.

In an exemplary embodiment, the mirror 54 is positioned at a 45° angle relative to both the light source 52 and the camera 58. This arrangement is such that the light from the light source 52 is reflected off the half-silvered mirror, up to the microlens sheeting or substrate 20 through the glass 40, and then reflected back down through the half-silvered mirror 54 and into the camera 58, as illustrated in FIG. 4. The light source 52 may provide light of a certain wavelength, polarized light, or retroreflected light. The term "retroreflected" as used herein refers to the attribute of reflecting an incident light ray in a direction antiparallel to its incident direction, or nearly so, such that it returns to the light source or the immediate vicinity thereof. Retroreflected light is preferred because it helps eliminate viewing the printed personalization information on the passport 14, making the floating image 30 easier to view.

The reader 10 may include a stationary camera 58, one moveable camera 58*a*, or two cameras 58, 60, as discussed in more detail in reference to FIGS. 5-8. One example of a suitable light source 52 is commercially available from Lumex, Inc. located in Palatine, Ill., a white, clear lens, TI format LED, under part number SSL-LX3054 UWC/A. One example of a suitable camera 58 is commercially available from Micron Technology, Inc. located in Boise, Id. as a 1.3 Mega-pixel CMOS color sensor camera. One example of a suitable half-silvered mirror 54 is commercially available from Edmund Industrial Optics located in Barrington, as N.J., having part number NT43-817.

The system includes a computer 56 (illustrated as box 56) in communication with the camera 58. The computer 56 processes the information obtained by either the first camera 58, second camera 60 or both cameras 58, 60. Any computer known in the art is suitable to be used in the passport reader 10.

Figure 6:
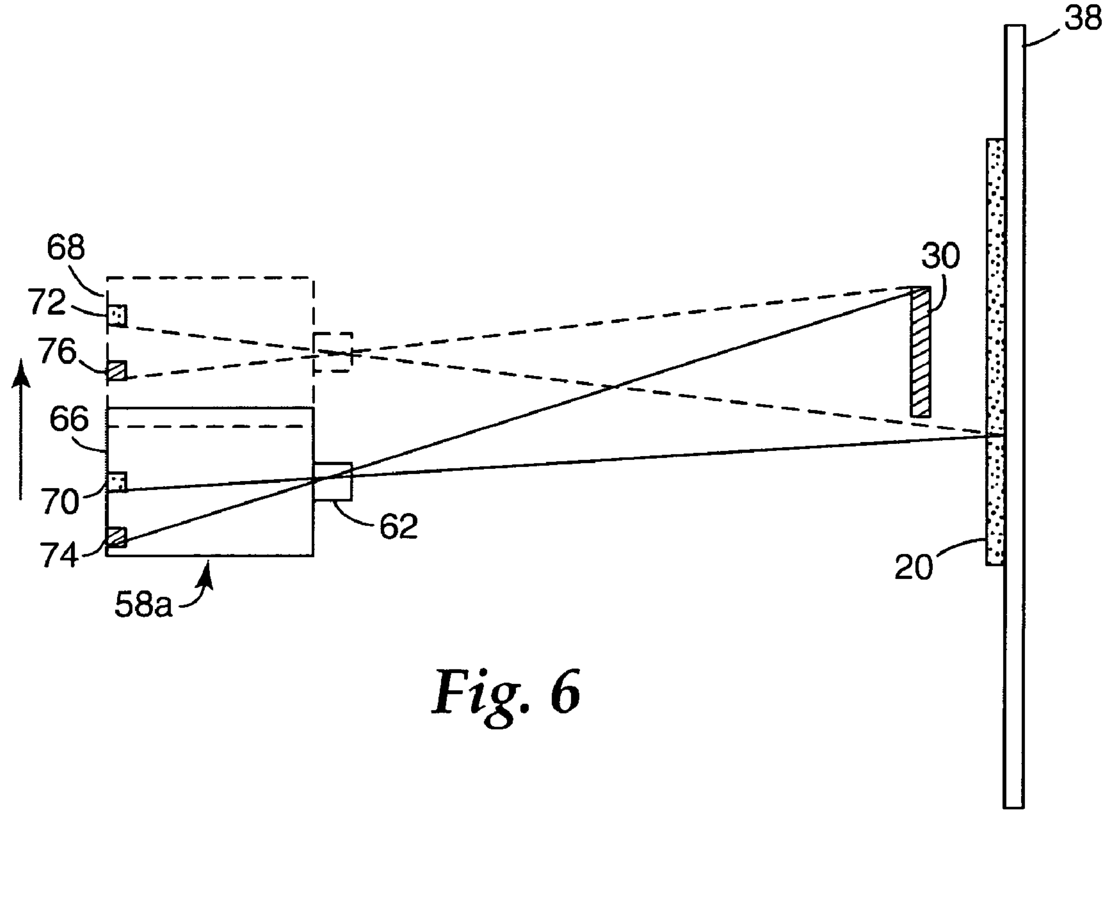
FIG. 6 illustrates a schematic view of another exemplary embodiment of the camera in the system for reading and authenticating a composite image in a sheeting of the present invention.
Figure 7:
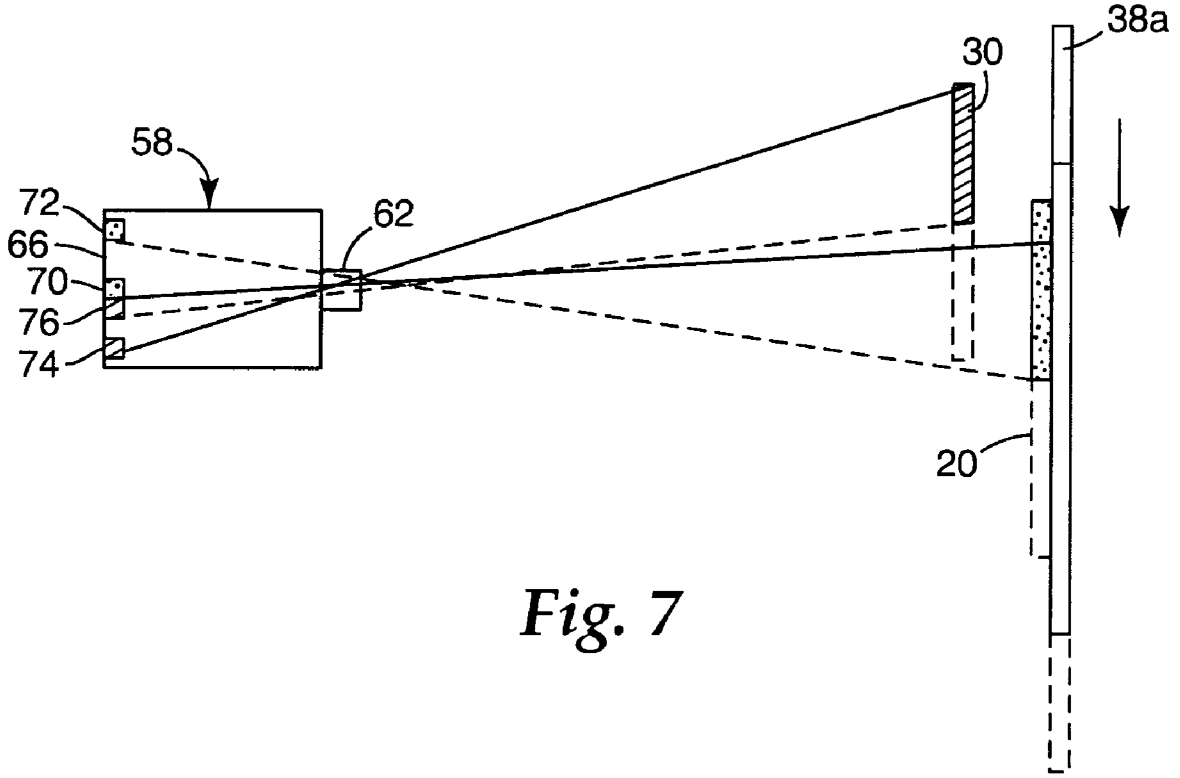
FIG. 7 illustrates a schematic view of yet another exemplary embodiment of the camera in the system for reading and authenticating a composite image in a sheeting of the present invention.

FIGS. 5-8 illustrate three different embodiments of the reader 10. In the first embodiment, which is illustrated in FIG. 5, the reader 10 includes a first camera 58 and a second camera 60. In the second embodiment, which is illustrated in FIG. 6, the reader includes a first moveable camera 58*a*. The camera 58*a* may move along a track inside the reader and be powered by a motor. In the third embodiment, which is illustrated in FIG. 7, the camera 58 is stationary, but a holder 38*a* of the passport 14 is moveable relative to the camera 58. The holder 38*a* may move along a track on top of the reader and be powered by a motor. The holder 38*a* preferably includes the glass 40. The three embodiments illustrated in FIGS. 5-7 are arranged so as to provide at least two views of the microlens sheeting 20 and the floating image 30. The images of the microlens sheeting 20 and floating image 30 are captured on the camera image planes 66, 68 and transmitted to the computer 56 for further processing. The first image 70 and second image 72 of the microlens sheeting are depicted graphically by boxes 70 and 72. The first image 74 and second image 76 of the composite floating image 30 are depicted graphically by boxes 74 and 76. The first image 70 and second image 72 of the microlens sheeting are compared by the computer 56. The first image 74 and second image 76 of the floating image 30 are compared by the computer 56. In one exemplary embodiment, the images 70, 72, 74, 76 are measured relative to the center of the camera planes 66, 68 as discussed in reference to FIG. 8.

Figure 8:
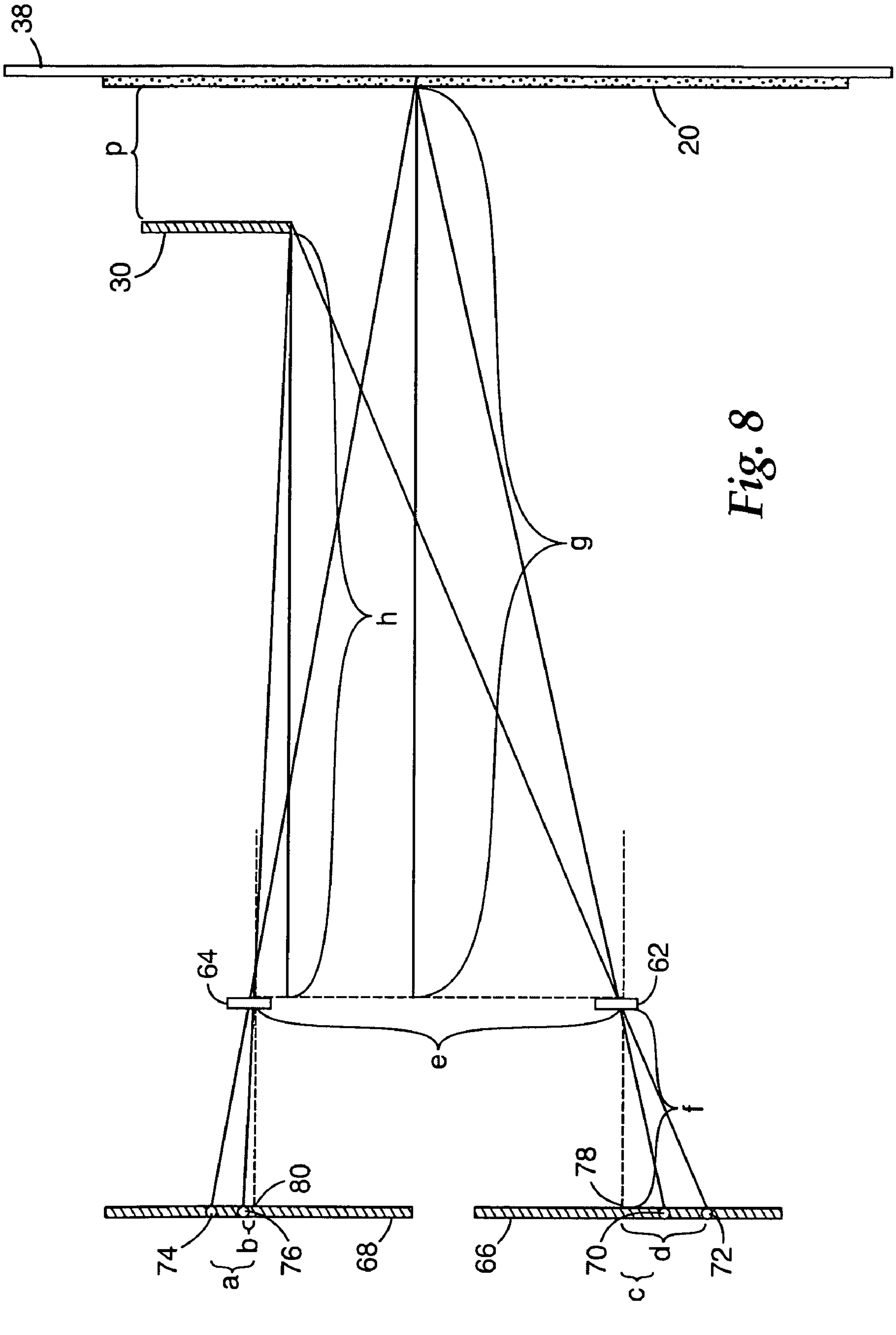
FIG. 8 illustrates the optics associated with the embodiments of the systems illustrated in FIGS. 5-7.

FIG. 8 illustrates the optics associated with the embodiments of the system illustrated in FIGS. 5-7. For simplicity, FIG. 8 illustrates a first camera image plane 66 and a second camera image plane 68. In one embodiment, the first image plane 66 may be part of the first camera 58 and the second image plane 68 may be part of a second camera 60, as illustrated in FIG. 5. However, the first image plane 66 may represent one camera 58*a* in a first position and the second image plane 68 may represent the same camera in a second position, as illustrated in FIG. 6. The optics illustrated in FIG. 8 represent the same relative measurements for the embodiment illustrated in FIG. 7, where the microlens sheeting 20 moves relative to the camera 58. In addition, the optics illustrated in FIG. 8 represent the same measurements for whether the composite image 30 is floating above or below the sheeting 20. Preferably, the position of the sheeting is fixed during the first and second pictures of the sheeting 20 by either the first and second camera 58, 60 or by the single camera 58. Alternatively, the single camera 58 is fixed during the first and second pictures of the sheeting 20 and the sheeting 20 moves from a first position and to a second position using holder 38*a*. Regardless, the system preferably captures two images of the composite sheeting 20 and the floating image 30 from two different perspectives.

The measurements illustrated in FIG. 8 are for calculating the distance "p" between the microlens sheeting 20 in the passport 14 and the floating image 30 floating above or below the sheeting, which is useful for authenticating or verifying the sheeting 20. Essentially, the system is comparing the first image and the second image of the microlens sheeting and comparing the first image and second image of the composite image floating above or below the sheeting, so that the images will cancel each other out, except for the floating distance.

The first camera 58 includes a first camera lens 62 and a first camera image plane 66 and the second camera 60 includes a second camera lens 64 and a second camera image plane 68. The first and second cameras 58, 60 both include a focal length "f" of their lens 62, 64. Preferably, the first and second cameras 58, 60 are similar cameras with the same focal lengths. The first camera image plane 66 has a center point 78. The second camera image plane 68 has a center point 80. The local length "f" is measured from the center point of the camera image planes to the lens of the cameras. The first camera 58 takes a first picture, records or captures a first image of the sheeting 20 and the floating image 30. The second camera 60 takes a second picture, records or captures a second image of the sheeting 20 and the floating image 30. The first image of the microlens sheeting 20 is represented schematically on the first camera image plane 66 as reference number 70. The first image of the floating image 30 is represented schematically on the first camera image plane 66 as reference number 72. The second image of the microlens sheeting 20 is represented schematically on the second camera image plane 68 as reference number 74. The second image of the floating image 30 is represented on the second camera image plane 68 as reference number 76. The lens 62, 64 of the cameras 58, 60 are preferably orthogonal relative to the microlens sheeting 20.

Distance "a" is the distance between the second image 74 of the microlens sheeting on the camera image plane 68 and the center 80 of the camera image plane 68. Distance "b" is the distance between the second image 76 of the floating image 30 on the camera image plane 68 and the center 80 of the camera image plane 68. Distance "d" is the distance between the first image 72 of the floating image 30 on the camera image plane 66 and the center 78 of the camera image plane 66. Distance "c" is the distance between the first image 70 of the microlens sheeting on the camera image plane 66 and the center 78 of the camera image plane 66. Distance "e" is the known distance between the centers of the lens 62, 64 of the cameras. Distance "g" is the known orthogonal distance between the lens 62, 64 of the cameras 58, 60 and the microlens sheeting 20. A relational point other than the center point of lens could be used with appropriate modification of the math formulas.

As a result, the system can measure distances "a", "b", "c", and "d". The distances "e", "f", and "g" are known distances based on how the reader 10 is built. The floating distance or distance p is the unknown distance. The system calculates distance "p" using the measured distances and known distances as follows:

$$h/e=f/(d-b) \text{ and } g/e=f/(c-a)$$

Divide h/e and g/e by each other to cancel out the distances "e" and distances "f":

$$\frac{h/e = f/(d-b)}{g/e = f/(c-a)} \rightarrow \frac{h}{g} = \frac{(c-a)}{(d-b)}$$

which provides a calculation for distance "h":

$$h=g(c-a)/(d-b)$$

Now that distance "h" can be calculated, the floating distance "p" can be calculated as follows:

$$p=g-h$$

The example below provides calculation of actual floating distance based on the formulas above.

The system's computer 56 calculates the floating distance "p." Then, the computer can compare the floating distance to the database of floating distances. This enables inspection authorities to identify any anomalies or discrepancies between the data presented by a traveler and data held in databases. If the calculated floating distance matches the floating distance in the database for the identified composite image 30, then the system authenticates the sheeting 20. If the calculated floating distance does not match the floating distances in the database for the identified composite image 30, then the system determines that the sheeting is not authentic.

In the embodiments illustrated in FIGS. 5-8, the system includes at least one camera that takes a first image and a second image of the microlens sheeting 20 having a floating image 30. The camera may move in any direction relative the sheeting 20 to obtain these first and second images. For instance, the camera may move in the x, y, or z direction relative to the sheeting 20. Alternatively, the camera may rotate around its center of mass relative to the sheeting. In addition, the camera may take multiple images of the sheeting and composite images.

In another alternative embodiment of reader 14 (not illustrated), the reader may have a one fixed focal-length camera. In this embodiment, the single focus camera is moveable between a first position and a second position perpendicular to the sheeting 20. The camera moves along a track between the first position and the second position. First, the camera moves until the microlens sheeting 20 comes into full focus, which establishes the first position of the camera. Then the camera captures a first image of the sheeting 20 and the composite image 30. Next, the camera moves until the composite image 30 comes into full focus, which establishes the second position of the camera. In the second position, the camera captures a second image of the microlens sheeting 20 and the composite image 30. The distance between the first camera position and the second camera position is the distance "p" between the microlens sheeting 20 in the passport 14 and the perceived distance of the floating image 30 floating above or below the sheeting or both.

The reader 10 is capable of locating the floating image 30 and identifying the floating image 30. The camera will first record the floating image 30 and then the computer 56 will compare the recorded floating image 30 with a database of floating images to identify the floating image. The computer 56 preferably includes a template matching program or a normalization correlation matrix, which compares a known image with a recorded image. One example of a normalization correlation is described in *Computer Vision* by Dana Bollard and Christopher Brown, copyright 1982, published by Prentice Hall, Inc., pages 65-70, which are hereby incorporated by reference.

The reader 10 may include radio-frequency identification ("RFID") reading capabilities. For instance the reader 10 may include the features disclosed in U.S. patent application Ser. No. 10/953,200, "A Passport Reader for Processing a Passport Having an RFID Element," (Jesme), which is hereby incorporated by reference. The system will read and authenticate a variety of different floating images.

In an additional embodiment, the floating distance may vary from one sheeting to another. Optionally, the system reads a security code embedded in the sheeting that contains information relating to the floating distance of that sheeting and authenticates the sheeting only if the calculated floating distance matches the floating distance provided in the security code. Alternatively, the security code is used to retrieve the proper floating distance from a database of floating distances.

The operation of the present invention will be further described with regard to the following detailed example, which for convenience references the Figures. These examples are offered to further illustrate the various specific and preferred embodiments and techniques. It should be understood, however, that many variations and modifications may be made while remaining within the scope of the present invention.

In this example, a single Micron Semiconductor 1.3 Megapixel color sensor camera from Micron Semiconductor, located in Boise, Id., and a microlens sheeting with a composite image floating at a known distance of 1 centimeter, +/−1 millimeter, was arranged as depicted in FIG. 6. The camera lens 62 was located at a measured distance of 12.5 centimeters ('g' in FIG. 8) from the microlens sheeting 20. The microlens sheeting with the floating image was a sample of 3M™ Confirm™ Security Laminate with Floating Images which is commercially available from 3M Company located in, St. Paul, Minn., as part number ES502.

A first image of the microlens sheeting and of the composite image was captured. The camera was then moved laterally and a second image of the microlens sheeting and the composite image was captured.

The first image of the microlens sheeting and composite image were first used to identify if the microlens sheeting had a composite image and to verify if the composite image was the correct image. The computer ran the template matching program which was based on the normalization correlation matrix disclosed in *Computer Vision* by Dana Bollard and Christopher Brown, published by Prentice-Hall, Inc., copyright 1982, pages 65-70, which has been incorporated by reference. Using the template matching program, the computer was able to identify at least one of the floating images and verify that the floating image was what was expected.

Distances 'c–a' and 'd–b' (FIG. 8) were determined by the computer. Since the camera captures the images in discrete pixels and the pixel density of the images formed by the camera is known, i.e. the number of pixels per millimeter is known, the computer can calculate the distances a, b, c and d. The computer calculates 'a'—the distance between points 72 and 80, 'b'—the distance between points 76 and 80, 'c'—the distance between points 70 and 78 and 'd'—the distance between points 74 and 78 by counting the number of pixels in each respective length, i.e. a, b, c and d, and then converting the number of counted pixels by the image pixel density to a length. For this example, the computer determined values for c–a and d–b was 7.6 millimeters and 8.3 millimeters respectively.

With g known and c–a and d–b now determined, h was calculated as follows.

$$h=g(c-a)/(d-b)=12.5(0.76)/(0.83)=11.45 \text{ centimeters}$$

With h now determined and g known, p—the floating height of the composite image—was calculated as follows.

$$p=g-h=12.5-11.45=1.05 \text{ centimeters}$$

As the known floating height of the composite image was 1 centimeter +/−1 millimeter, the measured floating height of 1.05 centimeters was within range. Therefore, the system verifies the security laminate with the floating images as an authentic security laminate.

The tests and test results described above are intended solely to be illustrative, rather than predictive, and variations in the testing procedure can be expected to yield different results.

The present invention has now been described with reference to several embodiments thereof. The foregoing detailed description and example have been given for clarity of understanding only. No unnecessary limitations are to be understood therefrom. All patents and patent applications cited herein are hereby incorporated by reference. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. A system for reading and authenticating a composite image in a sheeting, the sheeting including a composite image that appears to the unaided eye to be floating above or below the sheeting or both, the system comprising:

(a) a reader, comprising:

a first camera to capture a first image of the sheeting and a first image of the composite image floating above or below the sheeting or both;

a second camera to capture a second image of the sheeting and a second image of the composite image floating above or below the sheeting or both;

(b) a computer for comparing the first image and the second image of the sheeting and for comparing the first image and second image of the composite image floating above or below the sheeting or both to calculate the perceived distance between the sheeting and the composite image floating above or below the sheeting or both; and (c) a database including information about composite images that float above or below the sheeting or both and their floating distances relative to the sheeting.

2. The system for reading and authenticating a composite image in a sheeting of claim 1, wherein the computer is adapted to compare the first image of the composite image that floats above or below the sheeting or both to the database of composite images to identify the composite image.

3. The system for reading and authenticating a composite image in a sheeting of claim 2, wherein the system is adapted to compare the calculated perceived distance between the sheeting and the composite image with the floating distances in the database to provide information about the sheeting.

4. The system for reading and authenticating a composite image in a sheeting of claim 3, wherein the system is adapted to authenticate the sheeting when the calculated perceived distance matches the floating distance in the database for the identified composite image.

5. The system for reading and authenticating a composite image in a sheeting of claim 3, wherein the system is adapted to not authenticate the sheeting when the calculated perceived distance does not match the floating distances in the database for the identified composite image.

6. The system for reading and authenticating a composite image in a sheeting of claim 1, wherein the first camera and second camera are perpendicular to the sheeting.

7. The system for reading and authenticating a composite image in a sheeting of claim 1, wherein the system is adapted to locate the sheeting in a fixed position.

8. The system for reading and authenticating a composite image in a sheeting of claim 1, wherein the composite image appears under reflected light to float above the sheeting.

9. The system for reading and authenticating a composite image in a sheeting of claim 1, wherein the composite image appears in transmitted light to float above the sheeting.

10. The system for reading and authenticating a composite image in a sheeting of claim 1, wherein the composite image appears under reflected light to float below the sheeting.

11. The system for reading and authenticating a composite image in a sheeting of claim 1, wherein the composite image appears in transmitted light to float below the sheeting.

12. The system for reading and authenticating a composite image in a sheeting of any one of claims 8-11, wherein the composite image also appears to the unaided eye to be at least in part in the plane of the sheeting.

13. A system for reading and authenticating a composite image in a sheeting, the sheeting including a composite image that appears to the unaided eye to be floating above or below the sheeting or both, the system comprising:

(a) a reader, comprising a camera moveable between a first position and a second position, wherein in the first position the camera captures a first image of the sheeting and a first image of the composite image floating above or below the sheeting or both, wherein in the second position the camera captures a second image of the sheeting and a second image of the composite image floating above or below the sheeting or both;

(b) a computer for comparing the first image and the second image of the sheeting and for comparing the first image and second image of the composite image floating above or below the sheeting or both to calculate the perceived distance between the sheeting and the composite image floating above or below the sheeting or both; and (c) a database including information about composite images that float above or below the sheeting or both and their floating distances relative to the sheeting.

14. The system for reading and authenticating a composite image in a sheeting of claim 13, wherein the computer is adapted to compare the first image of the composite image that floats above or below the sheeting or both to the database of composite images to identify the composite image.

15. The system for reading and authenticating a composite image in a sheeting of claim 14, wherein the system is adapted to compare the calculated perceived distance between the sheeting and the composite image with the floating distances in the database to provide information about the sheeting.

16. The system for reading and authenticating a composite image in a sheeting of claim 15, wherein the system is adapted to authenticate the sheeting when the calculated distance matches the floating distance in the database for the identified composite image.

17. The system for reading and authenticating a composite image in a sheeting of claim 15, wherein the system is adapted to not authenticate the sheeting when the calculated perceived distance does not match the floating distances in the database for the identified composite image.

18. The system for reading and authenticating a composite image in a sheeting of claim 13, wherein the system is adapted to locate the sheeting in a fixed position.

19. The system for reading and authenticating a composite image in a sheeting of claim 13, wherein the composite image appears under reflected light to float above the sheeting.

20. The system for reading and authenticating a composite image in a sheeting of claim 13, wherein the composite image appears in transmitted light to float above the sheeting.

21. The system for reading and authenticating a composite image in a sheeting of claim 13, wherein the composite image appears under reflected light to float below the sheeting.

22. The system for reading and authenticating a composite image in a sheeting of claim 13, wherein the composite image appears in transmitted light to float below the sheeting.

23. The system for reading and authenticating a composite image in a sheeting of any one of claims 19-22, wherein the composite image also appears to the unaided eye to be at least in part in the plane of the sheeting.

24. The system for reading and authenticating a composite image in a sheeting of claim 13, wherein the camera is perpendicular to the sheeting.

25. A system for reading and authenticating a composite image in a sheeting, the sheeting including a composite image that appears to the unaided eye to be floating above or below the sheeting or both, the system comprising:

(a) a reader, comprising:
  (i) a camera; and
  (ii) a sheeting holder moveable between a first position and a second position, wherein the microlens sheeting is positioned on the sheeting holder, wherein in the first position the camera captures a first image of the sheeting and a first image of the composite image floating above or below the sheeting or both, wherein in the second position the camera captures a second image of the microlens sheeting and a second image of the composite image floating above or below the sheeting or both;

(b) a computer for comparing the first image and the second image of the sheeting and for comparing the first image and second image of the composite image floating above or below the sheeting or both to calculate the perceived distance between the sheeting and the composite image floating above or below the sheeting or both; and (c) a database including information about composite images that float above or below the sheeting or both and their floating distances relative to the sheeting.

26. The system for reading and authenticating a composite image in a sheeting of claim 25, wherein the computer is adapted to compare the first image of the composite image that floats above or below the sheeting or both to the database of composite images to identify the composite image.

27. The system for reading and authenticating a composite image in a sheeting of claim 26, wherein the system is adapted to compare the calculated perceived distance between the sheeting and the composite image with the floating distances in the database to provide information about the sheeting.

28. The system for reading and authenticating a composite image in a sheeting of claim 27, wherein the system is adapted to authenticate the sheeting when the calculated perceived distance matches the floating distance in the database for the identified composite image.

29. The system for reading and authenticating a composite image in a sheeting of claim 27, wherein the system is adapted to not authenticate the sheeting when the calculated perceived distance does not match the floating distances in the database for the identified composite image.

30. The system for reading and authenticating a composite image in a sheeting of claim 25, wherein the camera is perpendicular to the sheeting.

31. The system for reading and authenticating a composite image in a sheeting of claim 25, wherein the system is adapted to locate the sheeting in a fixed position.

32. The system for reading and authenticating a composite image in a sheeting of claim 25, wherein the composite image appears under reflected light to float above the sheeting.

33. The system for reading and authenticating a composite image in a sheeting of claim 25, wherein the composite image appears in transmitted light to float above the sheeting.

34. The system for reading and authenticating a composite image in a sheeting of claim 25, wherein the composite image appears under reflected light to float below the sheeting.

35. The system for reading and authenticating a composite image in a sheeting of claim 25, wherein the composite image appears in transmitted light to float below the sheeting.

36. The system for reading and authenticating a composite image in a sheeting of any one of claims 32-35, wherein the composite image also appears to the unaided eye to be at least in part in the plane of the sheeting.

37. A method of reading and authenticating a composite image in a sheeting, comprising the steps of:

providing a sheeting including a composite image that appears to the unaided eye to be floating above or below the sheeting or both;

recording a first image of the microlens sheeting and recording a first image of the composite image floating above or below the sheeting or both;

recording a second image of the microlens sheeting and recording a second image of the composite image floating above or below the sheeting or both;

calculating the distance between the sheeting and the composite image floating above or below the sheeting or both by comparing the first image and the second image of the microlens sheeting and by comparing the first image and second image of the composite image floating above or below the sheeting or both; and providing a database including information about composite images that float above or below the sheeting or both and their floating distances relative to the sheeting.

38. The method of claim 37, further including the step of:

identifying the composite image by comparing the first image of the composite image that floats above or below the sheeting or both to the database of composite images.

39. The method of claim 38, further including the step of:

comparing the calculated perceived distance between the sheeting and the composite image with the floating distances in the database to provide information about the sheeting.

40. The method of claim 39, further including the step of:

providing a signal to a user that the sheeting is authentic when the calculated perceived distance matches the floating distance in the database for the identified composite image.

41. The method of claim 38, further including the step of:

providing a signal to a user that the sheeting is not authentic when the calculated perceived distance does not match the floating distances in the database for the identified composite image.

42. The method of claim 37, wherein the composite image appears under reflected light to float above the sheeting.

43. The method of claim 37, wherein the composite image appears in transmitted light to float above the sheeting.

44. The method of claim 37, wherein the composite image appears under reflected light to float below the sheeting.

45. The method of claim 37, wherein the composite image appears in transmitted light to float below the sheeting.

46. The method of any one of claims 42-45, wherein the composite image also appears to the unaided eye to be at least in part in the plane of the sheeting.

47. The system for reading and authenticating a composite image in a sheeting according to any one of claims 1, 13, or 25, wherein the system is adapted to detect a security code embedded within the sheeting that includes information about the floating distance relative to the sheeting of the composite image that floats above or below the sheeting or both.

* * * * *

UNITED STATES PATENT AND TRADEMARK OFFICE

CERTIFICATE OF CORRECTION

PATENT NO. : 7,616,332 B2
APPLICATION NO. : 11/002943
DATED : November 10, 2009
INVENTOR(S) : Martin A. Kenner It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1351 days.

Signed and Sealed this

Fourteenth Day of December, 2010

David J. Kappos
*Director of the United States Patent and Trademark Office*